US010652086B2

(12) United States Patent
Chakrabarti et al.

(10) Patent No.: US 10,652,086 B2
(45) Date of Patent: *May 12, 2020

(54) CONVERGING IOT DATA WITH MOBILE CORE NETWORKS

(71) Applicant: Telefonaktiebolaget LM Ericsson (publ), Stockholm (SE)

(72) Inventors: Samita Chakrabarti, Sunnyvale, CA (US); Samy Touati, San Jose, CA (US); Ayush Sharma, San Jose, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/242,838

(22) Filed: Jan. 8, 2019

(65) Prior Publication Data

US 2019/0149407 A1 May 16, 2019

Related U.S. Application Data

(63) Continuation of application No. 15/042,450, filed on Feb. 12, 2016, now Pat. No. 10,212,030, which is a
(Continued)

(51) Int. Cl.
*H04L 12/24* (2006.01)
*H04L 12/46* (2006.01)
(Continued)

(52) U.S. Cl.
CPC ...... *H04L 41/0806* (2013.01); *H04L 12/4633* (2013.01); *H04L 63/029* (2013.01);
(Continued)

(58) Field of Classification Search
CPC . H04L 41/0806; H04L 63/029; H04L 69/167; H04L 12/4633; H04W 4/70;
(Continued)

(56) References Cited

U.S. PATENT DOCUMENTS 9,253,709 B2 2/2016 Ljung
10,212,030 B2 * 2/2019 Chakrabarti .......... H04L 63/029
(Continued)

FOREIGN PATENT DOCUMENTS

EP  2557854 A2  2/2013
EP  2658301 A1  10/2013
WO  2013004905 A1  1/2013

OTHER PUBLICATIONS

Technical Specification Group Services and System Aspects; Telecommunication management; Charging management; Online Charging System (OCS): Applications and interfaces (Release 12) 3GPP TS 32.296 V12.1.0; 650 Route des Lucioles-Sophia Antipolis, Dec. 2013, 88 pages.
(Continued)

*Primary Examiner* — Hassan Kizou
*Assistant Examiner* — Abdullahi Ahmed
(74) *Attorney, Agent, or Firm* — Sage Patent Group

(57) ABSTRACT

A method in a network device is described and includes selecting, based upon a service request, one or more device gateways from a plurality of device gateways that are communicatively coupled with a plurality of low powered devices. The low powered devices do not include Subscriber Identity Modules. Configuration information is transmitted over a public network to the selected device gateways, causing the selected device gateways to configure ones of the low power devices to perform actions according to the service request. Data is received from the selected device gateways over the public network that was generated by the configured low power devices. One or more GPRS Tunnel Protocol (GTP) tunnels are established with a Packet Data Network (PDN) gateway of a mobile network operator, and the received data is sent over the one or more GTP tunnels to be processed by the mobile network operator.

20 Claims, 10 Drawing Sheets

Related U.S. Application Data continuation-in-part of application No. 14/525,139, filed on Oct. 27, 2014, now Pat. No. 10,135,678.

(60) Provisional application No. 62/012,253, filed on Jun. 13, 2014.

(51) Int. Cl.

| | |
|---|---|
| *H04W 84/18* | (2009.01) |
| *H04W 88/16* | (2009.01) |
| *H04L 29/06* | (2006.01) |
| *H04W 12/02* | (2009.01) |
| *H04W 4/70* | (2018.01) |
| *H04W 12/00* | (2009.01) |
| *H04W 4/50* | (2018.01) |
| *H04W 4/80* | (2018.01) |

(52) U.S. Cl.
CPC .............. *H04L 69/167* (2013.01); *H04W 4/70* (2018.02); *H04W 12/003* (2019.01); *H04W 12/02* (2013.01); *H04W 84/18* (2013.01); *H04W 88/16* (2013.01); *H04W 4/50* (2018.02); *H04W 4/80* (2018.02); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/162* (2018.01); *Y02D 70/164* (2018.01); *Y02D 70/21* (2018.01); *Y02D 70/22* (2018.01); *Y02D 70/23* (2018.01); *Y02D 70/26* (2018.01)

(58) Field of Classification Search
CPC ..... H04W 12/02; H04W 84/18; H04W 88/16; H04W 4/50; H04W 4/80; H04W 12/003
See application file for complete search history.

(56) References Cited

U.S. PATENT DOCUMENTS

| | | | | |
|---|---|---|---|---|
| 2011/0310908 | A1* | 12/2011 | Park | H04L 12/66 370/401 |
| 2012/0059903 | A1 | 3/2012 | Kim | |
| 2012/0076047 | A1 | 3/2012 | Turanyi et al. | |
| 2013/0003972 | A1* | 1/2013 | Kang | H04W 12/04 380/270 |
| 2013/0288644 | A1* | 10/2013 | Schroeder | H04W 12/06 455/411 |
| 2013/0329653 | A1 | 12/2013 | Russell, Jr. et al. | |
| 2014/0199963 | A1* | 7/2014 | Mohebbi | H04W 76/12 455/410 |
| 2014/0223538 | A1* | 8/2014 | Van De Velde | H04L 12/2867 726/12 |
| 2014/0244838 | A1 | 8/2014 | Ryu et al. | |
| 2014/0280817 | A1* | 9/2014 | Uppalapati | H04L 41/044 709/223 |
| 2014/0351099 | A1* | 11/2014 | Zhu | G06Q 10/087 705/28 |
| 2015/0365278 | A1 | 12/2015 | Chakrabarti et al. | |
| 2016/0135175 | A1 | 5/2016 | Tarlazzi | |

OTHER PUBLICATIONS

Townsley, et al., IPv6 Rapid Deployment on IPv4 Infrastructures (6rd)—Protocol Specification, IETF, RFC 5969, 2010, 18 pages.
Universal Mobile Telecommunications System (UMTS); LTE; Evolved Packet System (EPS); 3GPP EPS AAA Interfaces (3GPP TS 29.273 version 8.0.0 Release 8); ETSI TS 129 273 V8.0.0, 2009, 79 pages.
ZigBee Specifications 2004-2012: ZigBee Doc.053474r20; the infrastructure and services available to applications operating on the ZigBee platform; Copyright 2012 ZigBee Stds. Org; 2400 Camino Ramon, Suite 375, San Ramon, CA 94583; http://www.zigbee.org; Se, 622 pages.
ZigBee-PRO Stack Profile: Platform restrictions for compliant platform testing and interoperability; Revision 5; copyright 1996-2014 ZigBee Alliance, Inc.; 2400 Camino Ramon, Suite 375, San Ramon, CA 94583; http://www.zigbee.org; Jan. 2008; 36 pages.
3GPP TS 23A02 V12.4.0 (Mar. 2014) "3rd Generation Partnership Project; Technical Specification Group Services and System Aspects; Architecture enhancements for non-3GPP accesses (Release 12)," Mar. 2014, 288 pages.
3GPP TS 29.274 V12.4.0 (Mar. 2014), "3GPP Evolved Packet System (EPS); Evolved General Packet Radio Service (GPRS) Tunnelling Protocol for Control plane (GTPv2-C)," 3rd Generation Partnership Project; Technical Specification Group Core Network and Terminals, Stage 3 (Release 12), Mar. 2016, 245 pages.
Bagnulo, et al., "Stateful: NAT64: Network Address and Protocol Translation from IPv6 Clients to IPv4 Servers", IETF, RFC 6146, 2011, 45 pages.
Baker, et al., "Framework IPv4/IPv6 Translation," IETF, Copyright IETF Trust (2011); RFC 6144, 2011, 31 pages.
Despres, R., "IPv6 Rapid Deployment on IPv4 Infrastructures (6rd)," Independent Submission; RFC 5569; Jan. 2010; 10 pages.
Droms, et al., "Dynamic Host Configuration Protocol for IPv6 (DHCPv6)," Network Working Group, RFC 3315; The Internet Society copyright 2003; Jul. 2003; 92 pages.
Extended European Search Report for Application No. 15171004.3, dated Oct. 21, 2015, 7 pages.
Frankel, et al., "(IPsec) and (IKE) Document Roadmap," IETF, RFC 6071; Copyright IEFT Trust 2011, 63 pages.
Hagino J., et al., "An IPv6-to-IPv4 Transport Relay Translator," Network Working Group, RFC 3142; The Internet Society copyright 2001, 2001, 11 pages.
Hui J., et al., "Compression Format for IPv6 Datagrams over IEEE 802.15.4-Based Networks," Network Working Group, RFC 6282; The IETF Trust copyright (2011), 2011, 24 pages.
IEEE Std 802.15.4: IEEE Standard for Local and Metropolitan area networks—"Part 15.4: Low-Rate Wireless Personal Area Networks (LR-WPANs)," IEEE Standards Association; Sep. 5, 2011; 314 pages.
International Preliminary Report on Patentability for Application No. PCT/IB2017/050639, dated Aug. 23, 2018, 10 pages.
International Search Report and Written Opinion for Application No. PCT/IB2017/050639, dated Apr. 18, 2017, 15 pages.
Kent S. et al., "Security Architecture for the Internet Protocol," Network Working Group; RFC 2401; Copyright the Internet Society Nov. 1998; 60 pages.
Kim E., et al., "Design and Application Spaces for IPv6 over Low-Power Wireless Personal Area Networks (6LoWPANs)," (IETF); RFC 6568, 2012, 28 pages.
Kim E., et al., Problem Statement and Requirements for IPv6 over Low-Power Wireless Personal Area Network (6LoWPAN) Routing, (IETF); RFC 6606, 2012, 32 pages.
Kushalnagar, et al., IPv6 over Low-Power Wireless Personal Area Networks (6LoWPANs) Overview Assumptions Problem Statement and Goals, Network Working Group; RFC 4919, 2007, 12 pages.
Li, et al., "IP/ICMP Translation Algorithm," RFC 6145, 2011, 33 pages.
Mawatari, et al., "464XLAT: Combination of Stateful and Stateless Translation," RFC 6877, 2013, 14 pages.
Monteregro, et al., "Transmission of IPv6 Packets over IEEE 802.15.4 Networks," Network Working Group, RFC 4944, 2007, 30 pages.
RFC 1180: Socolofsky, et al., "A TCP/IP Tutorial," Network Working Group, Request for Comments: 1180, Jan. 1991, 28 pages.
RFC 2460: Deering S., et al., "Internet Protocol Version 6 (IPv6)," Network Working Group, Request for comments: 2460, Dec. 1998, 39 pages.
RFC 2474: Nichols K., "Definition of the Differentiated Services Field (DS Field) in the IPv4 and IPv6 Headers," 1998, 20 pages, Network Working Group, The Internet Society, Request for Comments: 2474.

(56) References Cited

OTHER PUBLICATIONS

Rfc 2475: Blake S., "An Architecture for Differentiated Services," Network Working Group, The Internet Society, Request for Comments: 2475, 1998, 36 pages.
RFC 2597: Heinanen J., et al., "Assured Forwarding PHB Group," The Internet Society, Request for comments: 2597, 1999, 11 pages.
RFC 2675: Borman D., "IPv6 Jumbograms," Network Working Group, The Internet Society, Request for Comments: 2675, 1999, 9 pages.
RFC 2983: Black D., "Differentiated Services and Tunnels," Network Working Group, Request for Comments: 2983, Oct. 2000, 14 pages.
RFC 3086: Nichols K., et al., "Definition of Differentiated Services per Domain Behaviors and Rules for their Specification," Network Working Group, Request for Comments: 3086, 2001, 24 pages.
RFC 3140: Black D., et al., "Per Hop Behavior Identification Codes," Network Working Group, Standards Track, Request for Comments: 3140, 2001, 8 pages.
RFC 3246: Davie B., et al., "An Expedited Forwarding PHB (Per-Hop Behavior)," The Internet Society, Request for Comments: 3246, 2002, 16 pages.
RFC 3247: Charny A., et al., "Supplemental Information for the New Definition of the EF PHB (Expedited Forwarding Per-Hop Behavior)," Network Working Group, The Internet Society, Request for Comments 3247, 2002, 24 pages.
RFC 3260: Grossman D., "New Terminology and Clarifications for Diffserv," Network Working Group, The Internet Society, Request for Comments: 3260, 2002, 10 pages.
RFC 3289: Baker F., et al., "Management Information Base for the Differentiated Services Architecture," Network Working Group, The Internet Society, Request for Comments: 3289, 2002, 116 pages.
RFC 3290: Bernet Y., et al., "An Informal Management Model for Diffserv Routers," Network Working Group, The Internet Society, Request for Comments: 3290, 2002, 56 pages.
RFC 3317: Chan K., et al., "Differentiated Services Quality of Service Policy Information Base," Network Working Group, The Internet Society, Request for Comments: 3317, 2003, 96 pages.
RFC 4113: Fenner B., et al., "Management Information Base for the User Datagram Protocol (UDP)," Network Working Group, The Internet Society, Request for Comments: 4113, 2005, 19 pages.
RFC 4301: Kent S., et al., "Security Architecture for the Internet Protocol," The Internet Society, Network Working Group, Request for Comments: 4301, Dec. 2005, 101 pages.
RFC 4594: Babiarz J., et al., "Configuration Guidelines for DiffServ Service Classes," Network Working Group, Request for Comments: 4594, 2006, 57 pages.
RFC 5405: Eggert L., et al., "Unicast UDP Usage Guidelines for Application Designers," Network Working Group, IETF Trust, Request for Comments: 5405, 2008, 27 pages.
RFC 5865: Baker F., "A Differentiated Services Code Point (DSCP) for Capacity-Admitted Traffic," Internet Engineering Task Force (IETF), IETF Trust, Request for Comments: 5865, May 2010, 14 pages.
RFC 768: Postel, "User Datagram Protocol," Network Working Group, Request for Comments: 768, Aug. 28, 1980, 3 pages.
RFC 793: Postel J., "Transmission Control Protocol," DARPA Internet Program Protocol Specification, Request for comments: 793, Sep. 1981, 91 pages.
Shelby, et al., "Neighbor Discovery Optimization for IPv6 over Low-Power Wireless Personal Area Networks (6LoWPAN)," IETF, IETF Trust; RFC 6775, 2012, 55 pages.
SNMP Over OSI, Network Working Group; RFC 1161; IETF SNMP Working Group; Performance Systems Intl, Inc, 1990, 8 pages.
Specification of the Bluetooth System; Master Table of Contents & Compliance Requirements; Covered Core package version: 4.1, 2013, 2684 pages.
Technical Spec Group Core Network and Terminals; (GPRS); GTP across the Gn and Gp interface; (Release 12) 3GPP, 3GPP TS 29.060v12.4.0 (Mar. 2014); 650 Route des Lucioles; Sophia Antipolis; Valbonne, France, 2013, 180 pages.
Technical Spec Group Services and System Aspects; Telecommunication management; Charging management; (CDR) transfer (Release 12)3GPP, 3GPP TS 32.295 v12.0.0 (Sep. 2013); 650 Route des Lucioles; Sophia Antipolis; Valbonne, France, 2013, 32 pages.
Technical Specification Group Core Network and Terminals; Numbering addressing and identification (Release 12) 3GPP, 3GPP TS 23.003v12.2; 650 Route des Lucioles-Sophia Antipolis, Valbonne, FR, 2014, 87 pages.
Technical Specification Group Services and System Aspects; Quality of Service (QoS) concept and architecture (Release 11)3GPP, 3GPP TS 23.107v11.0.0; 650 Route des Lucioles-Sophia Antipolis, Valbonne,FR, 2012, 42 pages.
Technical Specification Group Services and System Aspects Telecommunication management; Charging management; Charging architecture and principles, 3GPP TS 32.240 V12.3.0, 3GPP, Release 12, 2013, 51 pages.

* cited by examiner

CONVERGING IOT DATA WITH MOBILE CORE NETWORKS

CROSS REFERENCE

This application is a continuation of U.S. application Ser. No. 15/042,450, filed Feb. 12, 2016, which is a continuation-in-part of U.S. application Ser. No. 14/525,139, filed Oct. 27, 2014, which claims the benefit of U.S. Provisional Application No. 62/012,253, filed Jun. 13, 2014, which are hereby incorporated by reference.

FIELD

Embodiments of the invention relate to the field of mobile networks; and more specifically, to the mobile network and Internet of Things (IOT) convergence.

BACKGROUND

Internet Protocol version 6 (IPv6) over Low Power Wireless Personal Area Networks (6lowPAN) and IPv6 over Constrained Node Networks (6lo) devices form wireless networks that can carry IPv6 packets in abridged form and connect to the IP network via a gateway which can process the 6lowPAN protocol (disclosed in RFCs 4919, 4944, 6282, 6568, 6606, 6775). These devices connect directly to the Internet or Cloud systems via an access router and not through the network of a telecom operator.

SUMMARY

According to some embodiments, a method in a network device includes selecting, by the network device based upon a service request from a customer, one or more device gateways from a plurality of device gateways. The plurality of device gateways are communicatively coupled with a plurality of low powered devices, and the plurality of device gateways do not include a Subscriber Identity Module (SIM). The method also includes transmitting configuration information over a public network to the selected one or more device gateways to cause the selected one or more device gateways to configure particular ones of the plurality of low power devices to perform actions according to the service request. The method further includes receiving, from the selected one or more device gateways over the public network, data generated by at least some of the configured particular ones of the plurality of low power devices. The method further includes establishing, specific to the one or more requested service actions, one or more GPRS Tunnel Protocol (GTP) tunnels with a Packet Data Network (PDN) gateway of a mobile network operator, and sending the received data over the one or more GTP tunnels to be processed by the mobile network operator.

In some embodiments, the one or more GTP tunnels include a plurality of GTP tunnels, a first portion of the received data is sent over a first of the plurality of GTP tunnels to be processed by the mobile network operator, and a second portion of the received data is sent over a second of the plurality of GTP tunnels to be processed by the mobile network operator.

In some embodiments, the service request identifies a plurality of service types, where each of the plurality of service types identifies a location or type of IOT device that can be used to identify the particular ones of the plurality of low power devices. The first portion of the received data corresponds to a first of the plurality of service types, and the second portion of the received data corresponds to a second of the plurality of service types.

In some embodiments, each of the plurality of GTP tunnels is a 3rd Generation Partnership Project (3GPP) S2a interface.

In some embodiments, the public network comprises the Internet.

In some embodiments, the at least some of the configured particular ones of the plurality of low power devices comprise sensor devices.

In some embodiments, the sensor devices are temperature sensor devices or moisture sensor devices, and wherein the received data comprises data values generated by said temperature sensor devices or moisture sensor devices.

In some embodiments, the service request identifies a service action. The service action is to enable, disable, start, or stop collection of data from the particular ones of the plurality of low power devices. The configuration information is based upon the identified service action.

In some embodiments, the service request further identifies a service type, and the service type identifies a location or type of IOT device that can be used to identify the particular ones of the plurality of low power devices. The service request does not include identifiers of the particular ones of the plurality of low power devices, and the selecting of the one or more device gateways from the plurality of device gateways is based upon the identified service type of the service request.

In some embodiments, the service request further identifies a service sub type value of a sub type field. The sub type field identifies a recipient of the data generated by the at least some of the configured particular ones of the plurality of low power devices. The identified service sub type value of the service request identifies the mobile network operator.

According to some embodiments, a non-transitory computer-readable storage medium has instructions which, when executed by one or more processors of a network device, cause the network device to perform operations. The operations include selecting, based upon a service request from a customer, one or more device gateways from a plurality of device gateways. The plurality of device gateways are communicatively coupled with a plurality of low powered devices, and the plurality of device gateways do not include a SIM. The operations also include transmitting configuration information over a public network to the selected one or more device gateways to cause the selected one or more device gateways to configure particular ones of the plurality of low power devices to perform actions according to the service request. The operations also include receiving, from the selected one or more device gateways over the public network, data generated by at least some of the configured particular ones of the plurality of low power devices. The operations also include establishing, specific to the one or more requested service actions, one or more GTP tunnels with a PDN gateway of a mobile network operator, and sending the received data over the one or more GTP tunnels to be processed by the mobile network operator.

According to some embodiments, a device includes one or more processors and one or more non-transitory computer-readable storage media. The one or more non-transitory computer-readable storage media have instructions which, when executed by the one or more processors, cause the device to perform operations. The operations include selecting, based upon a service request from a customer, one or more device gateways from a plurality of device gateways. The plurality of device gateways are communicatively coupled with a plurality of low powered devices, and the plurality of device gateways do not include a SIM. The operations also include transmitting configuration information over a public network to the selected one or more device gateways to cause the selected one or more device gateways to configure particular ones of the plurality of low power devices to perform actions according to the service request. The operations also include receiving, from the selected one or more device gateways over the public network, data generated by at least some of the configured particular ones of the plurality of low power devices. The operations also include establishing, specific to the one or more requested service actions, one or more GTP tunnels with a PDN gateway of a mobile network operator, and sending the received data over the one or more GTP tunnels to be processed by the mobile network operator.

In some embodiments, a network device can converge IOT devices not utilizing or including a SIM with a mobile network.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
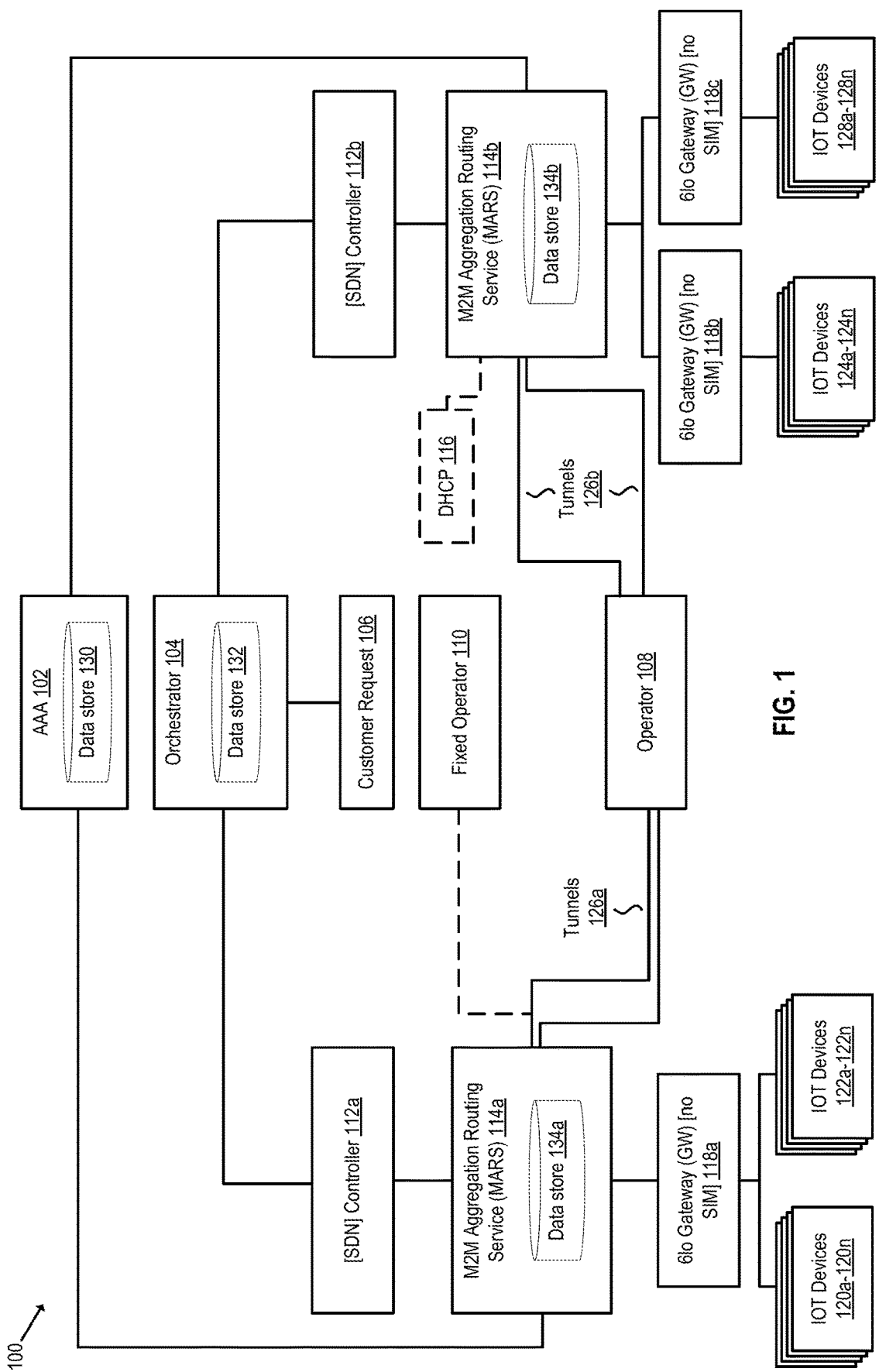
FIG. 1 illustrates a block diagram of a system 100 converging IOT devices without a Subscriber Identity Module with a mobile network according to some embodiments.

The following description describes methods and apparatuses for mobile network internet of things (IOT) convergence for IOT devices without a Subscriber Identity Module (SIM). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals-such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of some embodiments may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A network device may include network interfaces.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

A data store includes a non-transitory computer readable storage medium that stores data. The data store may include some or all of a non-transitory computer readable storage medium within an electronic device. In such a case, the data store may receive requests to read and write data to the non-transitory computer readable storage medium of the data store from a software process source representing software code currently executing via one or more processors on the electronic device. The data store may also receive requests to read and write data from sources external to the electronic device. Alternatively, the data store may be a standalone physical device that includes the non-transitory computer readable storage medium and basic hardware for performing read and write operations against the non-transitory computer readable storage medium. In such a case, the data store is coupled to external electronic device sources and receives requests from these external electronic device sources to read data from or write data to the non-transitory computer readable storage medium of the data store. The data on the data store may be organized in a variety of data structures (e.g., a relational database, a directed graph structure, an association list) depending upon the requirements of the source that makes the read and write requests.

A cellular network or mobile network is a wireless network distributed over geographical areas called cells, each served by at least one transmitter and receiver. These cells generally do not overlap with each other. Some cells may transmit and receive on the same frequencies as other cells. Portable transmitter/receiver units connect to the transmitter/receiver units for each cell to send and receive data such as voice communication and Internet Protocol packet data. Such a system of multiple cells may support a number of portable transmitter/receivers that is greater than the amount of available frequency bandwidth needed by this number of portable transmitter/receivers. A portable transmitter/receiver is able to move from one cell to another cell via a handover mechanism that coordinates the move between the original cell, the destination cell, and the portable transmitter/receiver. Examples of mobile network technologies include those defined by the 3rd Generation Partnership Project, which include components such as LTE (Long Term Evolution), UMTS (Universal Mobile Telecommunications System), and GSM (Global System for Mobile Communications).

According to some embodiments, a Machine to Machine (M2M) Aggregation Routing Services (MARS) collects Internet of Things (IOT) device data from low powered device gateways (e.g., 6lo interfaces or gateways) with no subscriber identity modules (SIMs), and then consults an AAA (authentication, authorization and accounting) server to authenticate the low powered device gateway. The MARS service then establishes a General Packet Radio Service Tunnel Protocol (GTP) tunnel with the mobile core of the operator's mobile (cellular) network (e.g., a packet data network (PDN) GW, evolved packet gateway (EPG) or a Data Connection Devices) to forward data from the low powered device gateways to the mobile core of the operator's mobile network. Thus, even though typical 3GPP (3rd Generation Partnership Project) technologies authenticate via a subscriber identity module (SIM), the MARS service allows a low powered device gateway without a SIM to authenticate with a mobile network. As a result, telecom operators have a method to account for the data from IOT devices connected to these low powered device gateways without SIMs and they can offer or monetize services for these IOT devices and networks. Therefore, the MARS service converges the pure IOT data of these SIM-less low powered device gateways with a mobile network so that the mobile core of the mobile network may process this data.

FIG. 1 illustrates a block diagram of a system 100 converging IOT devices with a mobile network according to some embodiments. System 100 includes IOT a set of devices 120*a-n*, 122*a-n*, 124*a-n*, and 128*a-n*. These devices include a variety of low powered or constrained node devices that may utilize 6lo or 6lowPAN communications protocols. Examples of IOT devices include temperature sensors, moisture sensors, light intensity sensors, utility meters, gas level sensors, switch devices, light emitters, sound sensors, vehicles, charging points, field soil sensors, industrial device monitors, building monitors, bridge monitors, environmental monitors, and body sensors.

System 100 includes 6lo gateways (GWs) 118*a-c*. These 6lo GWs are coupled with the IOT devices 120-28 via a link layer wireless communications protocol such as Bluetooth (e.g., Bluetooth v.4.1, December 2013).

System 100 also includes a M2M aggregation routing service (MARS) 114*a-b*. In some embodiments, the MARS service is coupled with a controller 112, the 6lo GW 118, and an operator 108. The operator 108 is a gateway operated by a mobile operator that is coupled with external IP networks such as the Internet. The MARS service is coupled with the 6lo GW 118 using a Wi-Fi, Ethernet, or a similar layer 2 protocol non-mobile connection. This connection may be part of a private network administered by the mobile operator.

In some embodiments, system 100 receives customer request 106 from a customer associated with a customer account. The system 100 receives customer request 106 at an orchestrator 104. Orchestrator 104 may be software residing on a separate device coupled to controller 112, or may be a software stored in non-transitory computer readable storage medium of an electronic device that also includes the software for controller 112. The customer request 106 identifies a service type and a service action.

A service type identifies a location and/or type of IOT device that a customer wishes to activate or enable. For example, a customer may identify a set of light sensors in a warehouse location. The locations of the IOT devices may be identified using a data store of available locations for the selected customer within data store 132. Data store 132 may also store the available types of IOT devices at the available locations associated with the particular customer.

A service action identifies an action that a customer has selected for the IOT devices identified using the service type. The action can take a variety of forms, and can be different for different embodiments. For instance, in some embodiments, a service action may include, but not limited to: 1) a request for a single report of current data from running IOT devices (e.g., the orchestrator 104 may receive a request to report the current temperature data from a set of sensors in a freezer); 2) a request to report the current status of the selected IOT devices (e.g., the orchestrator 104 may receive a request to report the functional status and any error conditions of a set of moisture sensors; 3) a request to enable, disable, start, or stop collection of data from the selected IOT devices; 4) a request to enable security between the selected IOT devices and the 6lo GW associated with the selected IOT devices, and/or to enable security between the 6lo GW and the MARS service (e.g., the request may be to enable an IPSec (Internet Protocol Security) tunnel); 5) a request for the 6lo GW to re-route communications between the 6lo GW and the MARS service (e.g., the request may be to re-route through an under-utilized network device); and 6) a request for configuration of the 6lo GW, including a configuration of selected IOT devices associated with the 6lo GW (e.g., a configuration option may include calibration of selected IOT devices associated with the 6lo GW or a configuration of the reporting rate for selected IOT devices associated with the 6lo GW). Additional details regarding service actions are described in reference to FIG. 4.

In some embodiments, customer request 106 also includes a sub type indicator. This sub type indicator indicates to the 6lo GW whether to send data received from the IOT devices identified in the service type to the operator 108 or to a fixed operator 110. Some customer requests 106 do not include service actions that instruct the 6lo GW to return data. In such a case, a sub type indicator may not be specified. A fixed operator, such as fixed operator 110, is a non-mobile operator that may receive the data from the selected IOT devices indicated by the service type. For example, a fixed operator may be an internet service provider (ISP) or cloud service.

Once the orchestrator 104 receives the customer request 106 indicating the service type, service action, and optionally sub type indicator, the orchestrator 104 communicates this information to the controller 112. In addition, the orchestrator 104 also sends a customer identifier (ID) identifying the customer accessing the orchestrator 104 to the controller 112. In some embodiments, the customer ID is also known as a subscriber ID. The orchestrator 104 may determine the customer ID based upon login information used by the customer to access the orchestrator 104 and submit the customer request 106.

In some embodiments, the orchestrator 104 is an application residing on the same physical network device as the MARS service 114. In such an embodiment, the orchestrator 104 communicates directly with the MARS service and the controller 112 is not used.

In some embodiments, controller 112 includes a data store to determine the correct MARS service to communicate with and to determine which interface or protocol to communicate with the MARS service. The physical layout of the controller 112 will be described in more detail in relation to FIG. 6.

The controller 112 communicates the service type, service action, sub type indicator (if provided), and customer ID to the MARS service 114. The controller 112 and the MARS service 114 may communicate over an interface using a different protocol than that used by the customer request 106, and this may require conversion of the message(s) including the service type, service action, customer ID, and sub type indicator provided by the orchestrator 104 to the correct protocol. In some embodiments, the communications between the MARS service 114 and the controller 112 is through a non-mobile link layer protocol such as Ethernet, Wi-Fi, Asynchronous Transfer Mode (ATM), etc.

For each customer request 106, the MARS service 114 receives the service type, service action, sub type indicator, and customer ID from the controller 112. The MARS service determines which selected 6lo GW 118 includes the IOT devices identified in the service type. The information regarding which 6lo GWs are coupled to which IOT devices at which geographic location may be stored in a data store 134. A set of profile properties of the 6lo GWs and IOT devices that the MARS service 114 communicates with may also be stored in data store 134. The profile properties for each selected 6lo GW defines a set of supported communications protocols, security settings, extensions, and other configuration elements for the MARS service to communicate with the selected 6lo GW (e.g., the MARS service may convert the service action it receives from the controller 112 in to a format that may be understood by the selected 6lo GW).

The MARS service 114 determines which of the 6lo GWs 118 to communicate with based on the service type, and transmits one or more messages to the selected 6lo GW 118 to cause the 6lo GW 118 to select a set of one or more IOT devices based on the service type, and configures the IOT devices to perform a particular action according to the service action. In some embodiments, the one or more messages transmitted by the MARS service to the selected 6lo GW 118 also includes an Internet Protocol version 6 (IPv6) prefix used to configure the IP addresses of the selected IOT devices identified based on the service type. An IPv6 device, such as one of the selected IOT devices, configures its IPv6 address using IPv6 autoconfiguration by appending the prefix to a unique identifier that the device has determined to be unique based on IPv6 neighbor discovery protocols. In some alternative embodiments, the IP addresses of the IOT devices are assigned via an IPv6 (Internet Protocol version 6) based DHCP (Dynamic Host Configuration Protocol) server (e.g., DHCP server 116) instead of via IPv6 address auto-configuration. In another embodiment, the IOT devices might be addressed using IPv4 and the MARS service 114 may communicate with these IOT devices using IPv4. In some embodiments, the MARS service may further support non-IP based IOT devices by providing a proxy service.

In some embodiments, the MARS service 114 utilizes IPv6/IPv4 transition mechanisms (e.g., Stateless IP/ICMP (Internet Control Message Protocol) Translation, RFC 6145, 6144; tunnel brokerage; 6rd, RFC 5569, 5969; Transport Relay Translation, RFC 3142; Network Address Translation 64 (NAT64), RFC 6146, RFC 6877) to connect to the IPv6 based 6lo GW 118 through an IPv4 network.

After the selected 6lo GW 118 receives the one or more configuration messages from the MARS service, it sends a confirmation message to the MARS service 114 for the requested service type including an acknowledgement of configuration message receipt to the MARS service 114.

Many of the service actions cause the selected 6lo GW 118 and the selected IOT devices to return IOT sensor data and/or status data to the MARS service 114 (e.g., a service action for temperature sensors to start gathering data at a certain rate). In these cases, the MARS service 114 forwards the received data from the 6lo GW to an operator. The MARS service 114 may be able to communicate with more than one operator, as each customer sending a customer request may be associated with separate operators. To determine which operator to send the received data to, the MARS service sends a request to an AAA (authentication, authorization, and accounting) server 102 to cause the AAA server 102 to determine if it has a record associated with the service type identifier, customer ID, and IP address of the selected 6lo GW corresponding to the received customer request 106. The AAA server 102 includes record(s) associating an operator identifier with the unique identifier of a service type identifier, customer ID, and IP addresses of the selected 6lo GW. If the AAA server 102 determines that a record does exist, the MARS service 114 receives from the AAA server the operator identifier associated with the particular service type, customer ID, and 6lo GW address. The MARS service 114 uses this operator identifier to determine which operator to send the received data from the 6lo GW to. In some embodiments, this operator information is an APN (access point name) if the operator identified is a mobile operator such as operator 108.

In some embodiments, the MARS service sends such a request to the AAA server 102 every time a customer request 106 is received. In alternative embodiments, the MARS service sends such a request to the AAA server 102 only if no session exists that may be identified by the service type, customer ID/subscriber ID, and 6lo GW IP address corresponding to the received customer request 106.

In some embodiments, each record on the AAA corresponding to unique service type, customer ID, and GW address combination also includes an active/inactive flag, and records are marked as active once a successful request matching that record from the MARS service 114 is made, or marked as inactive if the MARS service 114 communicates a termination request to the AAA server 102 for the service corresponding with the record.

The MARS service 114 may communicate with the AAA server using standard AAA protocols such as RADIUS (Remote Authentication Dial In User Service) and Diameter, with the additional information being requested using custom vendor extensions.

In some embodiments, the MARS service 114 receives additional information from the AAA server 102, including but not limited to compression configuration information, security configuration information, and quality of service (QoS) configuration information for the unique identifier of service type, customer ID, and 6lo GW address combination. This additional information may be stored as attribute-value pairs on the AAA server 102 in data store 130, and may be supplied by the operator or customer when the customer is registered with the operator's mobile system.

After the MARS service 114 receives this additional information, it may send one or more configuration messages to the 6lo GW 118 based on this additional information. For example, the MARS service 114 may send configuration messages to the 6lo GW 118 to cause it to compress the data sent from the 6lo GW 118 to the MARS service 114 using a specified compression algorithm (e.g., the deflate compression algorithm) or to request the 6lo GW to cause the selected IOT devices to compress the data the IOT devices send to the 6lo GW 118. As another example, the MARS service may send configuration messages to the 6lo GW 118 to cause the 6lo GW to encrypt any messages sent by the 6lo GW 118 to the MARS service 114.

After the 6lo GW 118 receives the additional configuration message(s), the 6lo GW 118 may begin to send back any sensor data or status data from the IOT devices to the MARS service 114 if the service action from the customer request 106 indicated that the 6lo GW 118 should return data to the MARS service 114 (e.g., a service action indicating the start of sensor data collection).

The MARS service 114 forwards this received data from the selected 6lo GW 118 to the operator identified in the operator identifier from the AAA server 102. The identified operator may be a mobile network operator, such as the operator 108. Alternatively, the identified operator may be a fixed operator, such as fixed operator 110.

In the case where the identified operator is a mobile operator, such as operator 108, the MARS service 114 also establishes one or more tunnels 126 with the operator 108. This tunnel encapsulates the packetized data between the MARS service and the operator 108. In some embodiments, this tunnel is a GPRS Tunneling Protocol (GTP; 3GPP TS 29.060, 32.295, 29.274) tunnel.

In some embodiments, the MARS service 114 aggregates data from the IOT devices according to the type of the data as identified in the service type. A type of data refers to a type of sensor or device, such as temperature measurement devices, or switch devices. Aggregation refers to the collection of multiple data elements into a single data stream or element over a period of time, or another organizational method for data. Each set of the aggregated data is sent to the corresponding operator 108 using a separate GTP tunnel. In one embodiment, even if the destination operator for two sets of the aggregated data streams is the same, the MARS service 114 may create separate tunnels for each stream to the operator 108 if the MARS service 114 has been configured to do so. In one embodiment, if two sets of data of the same type are to be sent to different operators, then they will not be aggregated together.

In some embodiments, the MARS service 114 creates a GTP tunnel for each 6lo GW 118. Data from all the IOT devices associated with a 6lo GW 118 are communicated to the operator 108 using a single GTP tunnel, if that data is destined for the same operator. Whether the MARS service 114 creates a GTP tunnel per 6lo GW or per service type may depend upon a policy set by the mobile operator. The MARS service 114, in one embodiment, retrieves this policy information from the AAA server 102. In some embodiments, this policy is included in the customer request 106 or can be obtained from a policy server (e.g., a policy and charging rules function (PCRF) server) based on customer/service credentials, and is passed to the MARS service via the orchestrator 104 and controller 112.

Once the data from the IOT devices identified by the service type in the customer request 106 reaches the operator 108, the operator 108 may forward the data to the customer. The data may be forwarded and presented to the customer via an application such as orchestrator 104. The operator 108 may also charge the customer for the data and enable QoS for the data. Further details regarding the operation of the operator 108 will be described in relation to FIG. 3.

In some embodiments, system 100 includes multiple sets of IOT devices, such as IOT devices 120-128. Each set of IOT devices may be devices of a certain type (e.g., a temperature sensor). Multiple sets of devices may be coupled with a single 6lo GW, depending on, for example, a configuration determined by an administrator or physical constraints such as the distance between IOT devices. Multiple 6lo GWs 118 may also be coupled with a single MARS service 114. Multiple MARS service modules may further be coupled with a single operator or single AAA server. In this manner, a customer may be able to access many sets of IOT devices through a central interface organized by an operator.

Figure 2:
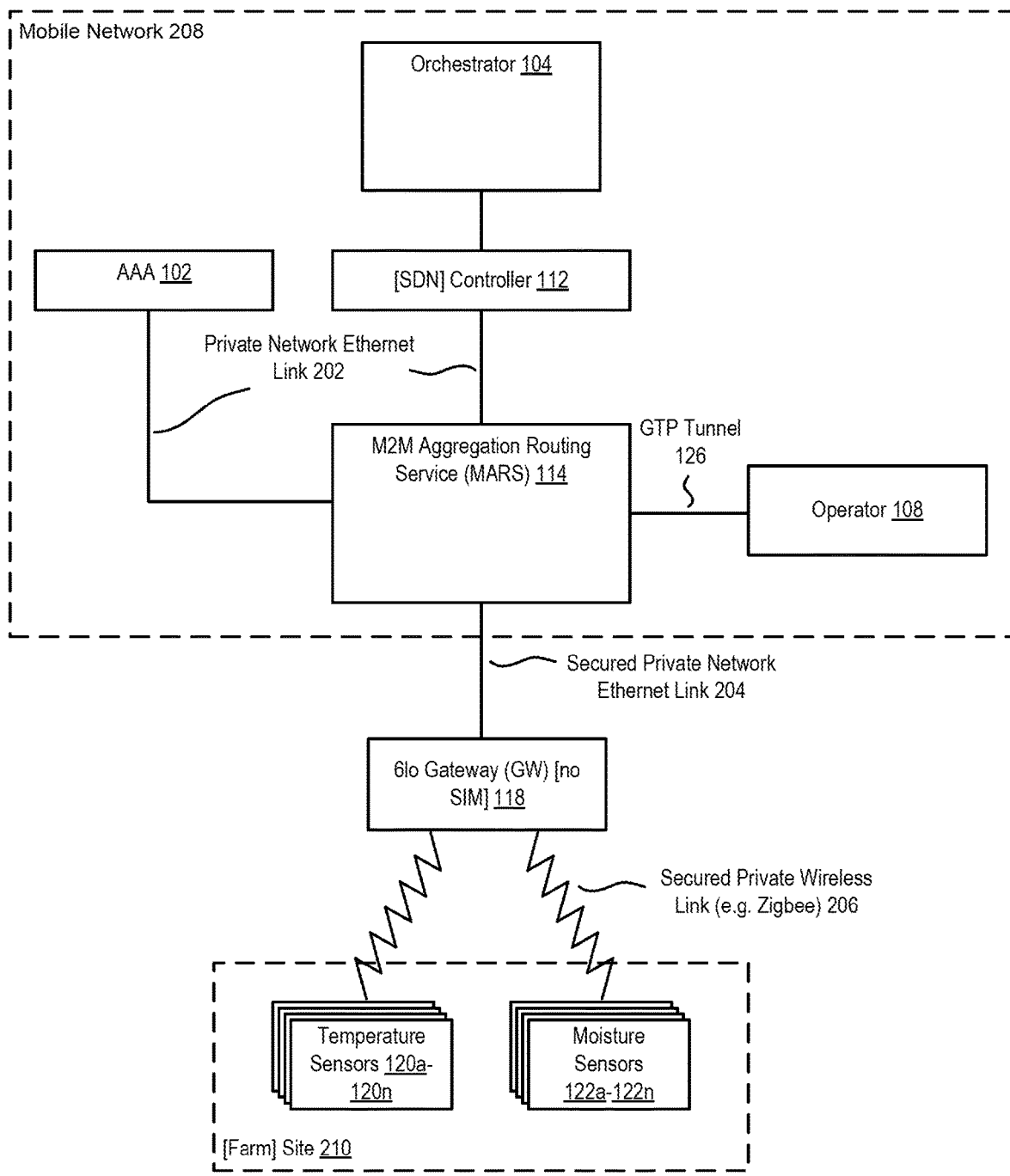
FIG. 2 illustrates an exemplary version of system 100 including exemplary physical connections and layout between nodes and devices and the protocols and security features used on the connections according to some embodiments.

FIG. 2 illustrates an exemplary embodiment of system 100.

In the embodiment illustrated in FIG. 2, the controller 112 is coupled with the MARS service 114 via a private network Ethernet link 202. The communications between these the controller 112 and the MARS service 114 using private network Ethernet link 202 may be secured using technologies such as Internet Protocol Security (IPSec; RFCs 4301, 6071, 2401, etc.) based virtual private networks (VPNs) or data link layer security (e.g. private VLANs). A private network Ethernet link 202 is also used between the AAA server 102 and the MARS service 114.

The MARS service may reside separately on a network device or may share the same network device hardware with another component of the mobile network. In the depicted embodiment, the MARS service resides in a network device at the edge of mobile network 208. This network device may be, although not required, a building aggregation router device, site aggregation switching device, edge switching device, access router, or other edge access device. This network device may also include an existing 3GPP mobile network element, such as an Evolved Packet Data Gateway (ePDG; 3GPP TS 23.402 v12.4.0).

The MARS service is coupled to the operator 108, which represents a mobile core gateway device such as a PDN (packet data network) GW, via a GTP (GPRS Tunneling Protocol; 3GPP TS 29.060, 32.295, 29.274) tunnel 126. GTP is an IP based protocol of the mobile network. GTP may be used with TCP or UDP. The MARS service and the operator 108 may exchange data using various different protocols, such as Internet Protocol (IP), X.25, or Frame Relay, based on the specifications or support of the operator 108. These protocols are encapsulated by the GTP tunnel between the MARS service and the operator 108.

The MARS service 114 is coupled to the 6lo GW 118 using a secured private network Ethernet link 204 in the depicted embodiment. In some embodiments, this link is not private and is instead a link in a public network (e.g., the Internet). In some embodiments, the link is not a secured link. Although the link is an Ethernet link in the depicted embodiment, the link between the MARS service 114 and the 6lo GW 118 is not limited to Ethernet and can be implemented using other link layer technologies (e.g., Wi-Fi (IEEE 802.11), ATM, and Point-to-Point ("PPP"; RFC 1161). In some embodiments, when the 6lo GW 118 is first connected or reconnected to the private (or public) network, it uses a DNS server to discover the IP address of the MARS service 114 to register with the MARS service. The MARS service stores in its data store the IP address of the 6lo GW 118 after registration.

In the depicted embodiment, a secured connection may be initiated during an initial configuration of the 6lo GW 118 by the MARS service 114 as specified by the orchestrator 104 using a service action. Such a secured connection may also be configured based on received information from the AAA server 102.

This secure connection may be a layer 2 secure channel implemented using a layer 2 secure channel protocol (e.g., layer 2 MPLS (Multiprotocol Label Switching) VPN). The secure connection may also be a layer 3 secure channel such as an IPSec tunnel with Encapsulating Security Payload (ESP). In one embodiment, the controller 112 specifies the type of secure channel based on the security protocols available between the MARS service 114 and the 610 GW 118. Each secured channel that is created may be identified by the MARS service 114 using the customer ID, service type, tunnel ID, 6lo GW IP address, or any combination thereof.

In the depicted embodiment, the 6lo GW 118 resides outside the mobile network 208 and may not be owned or operated by the mobile operator that operates the MARS service 114. The 6lo GW 118 is coupled with various IOT devices, such as temperature sensors 120 and moisture sensors 122 on the customer's agricultural farm site 210, with a secured private wireless link 206. This link may be implemented using any short or long range wireless communications link layer protocols or air interfaces. Examples include, but not limited to, Bluetooth, ZigBee (ZigBee 2004, 2006, PRO), Z-wave (Z-Wave Alliance), Wi-Fi (IEEE 802.11), wireless personal area network technology (e.g., IEEE 801.15.4), and Digital European Cordless Telecommunications (DECT). In one embodiment, the communications between the 6lo GW 118 and the IOT devices 120-122 are secured.

The security used for securing link 206 may require a key to encrypt communications between the 6lo GW and the IOT devices 120-22. This key may be a device key provided by the vendor of the IOT device and stored on the 6lo GW 118 to allow the 6lo GW to communicate with the IOT device. In some embodiments, the MARS service 114 generates a key based upon the service type and sub type indicator the MARS service 114 receives from the controller 112. The MARS service 114 passes this generated key to the 6lo GW 118, which then uses this generated key in combination with the device key for the connected IOT devices to securely communicate with the IOT devices. The controller 112 may send to the MARS service 114 information about the key and how to generate the key, and the method by which the 6lo GW 118 should utilize the key to encrypt communications (e.g., the controller may request that the key be used as a group password for a VPN connection between the IOT devices and the 6lo GW). In some embodiments, the security is configured using the NETCONF (Network Configuration Protocol) protocol.

Figure 3:
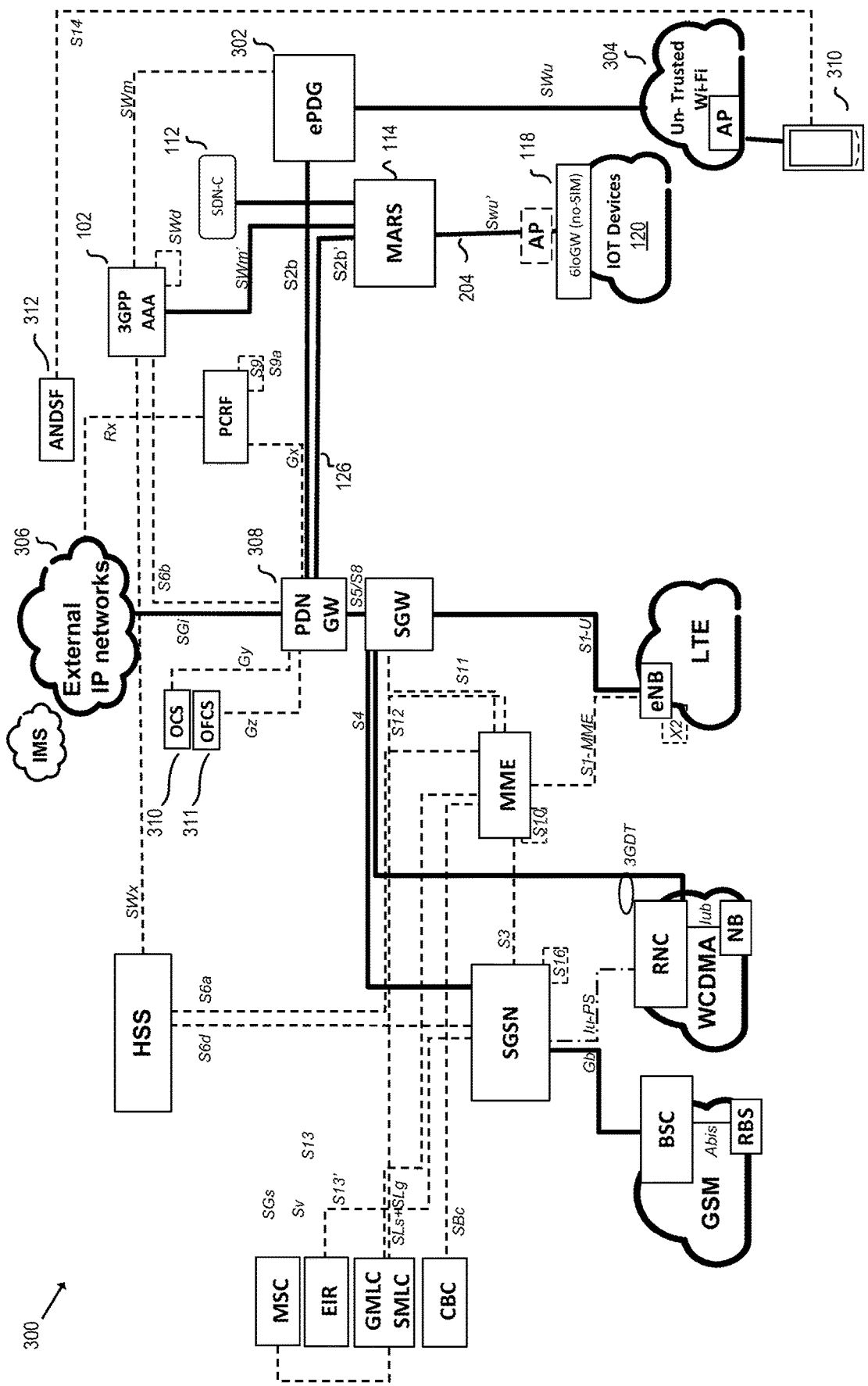
FIG. 3 illustrates an exemplary 3GPP architecture 300 with a MARS service 114 according to some embodiments.

FIG. 3 illustrates an exemplary 3GPP architecture 300 with a MARS service 114 according to some embodiments. The MARS service 114 is coupled to the external IP networks 306 (e.g., the Internet) via the PDN GW. The MARS service 114 is coupled with the PDN GW 308 via one or more GTP tunnels 126. The PDN GW 308 may implement functionalities of operator 108. The MARS service utilizes various functionalities of the PDN GW 308. In some embodiments, the MARS service utilizes the offline charging functionality of the PDN GW 308 to charge (i.e., collect a payment) for data sent and/or received according to volume, time of day, and service type. The MARS service may also utilize the online real time charging functionality of the PDN GW 308 to charge in real time based on service usage. In some embodiments, this charging is performed via OFCS (offline charging system; 3GPP TS 32.240) 311 and OCS (online charging system; 3GPP TS 32.296) 310. The PDN GW 308 may also provide QoS or rate limiting functions on a flow level using dedicated bearers (i.e., transport services with QoS attributes; referenced in 3GPP TS 23.107, which is hereby incorporated by reference) to data received from the MARS service 114. Each flow may correspond to a different service type and GTP tunnel as described previously. The PDN GW 308 may support multiple APNs (as described in 3GPP TS 23.003, which is hereby incorporated by reference) and may expose this to the MARS service 114. In such a case, the MARS service 114 may utilize this multiple APN functionality of the PDN GW to forward data to multiple packet data networks (PDNs; e.g., external IP networks) as defined in each APN at the PDN GW 308.

The exemplary architecture 300 also includes an ePDG (Evolved Packet Data Gateway) 302, which allows the 3GPP system to accept data from devices that include a SIM but which are accessing the mobile network using an untrusted connection. For example, for device 310 with a SIM, an access network discovery and selection function service (ANDSF) 312 directs the device 310 to access untrusted Wi-Fi network 304. Upon connecting to this network, device 310 connects to ePDG 302 using an IPSec tunnel, after which ePDG 302 establishes a GTP tunnel for the device 310 to PDN GW 308. The ePDG 302 may also authenticate and/or authorize the device 310 via AAA server 102 using the identifying information in the SIM for device. In some embodiments, the MARS service 114 is a software component that resides with the ePDG 302 on a network device.

Figure 4:
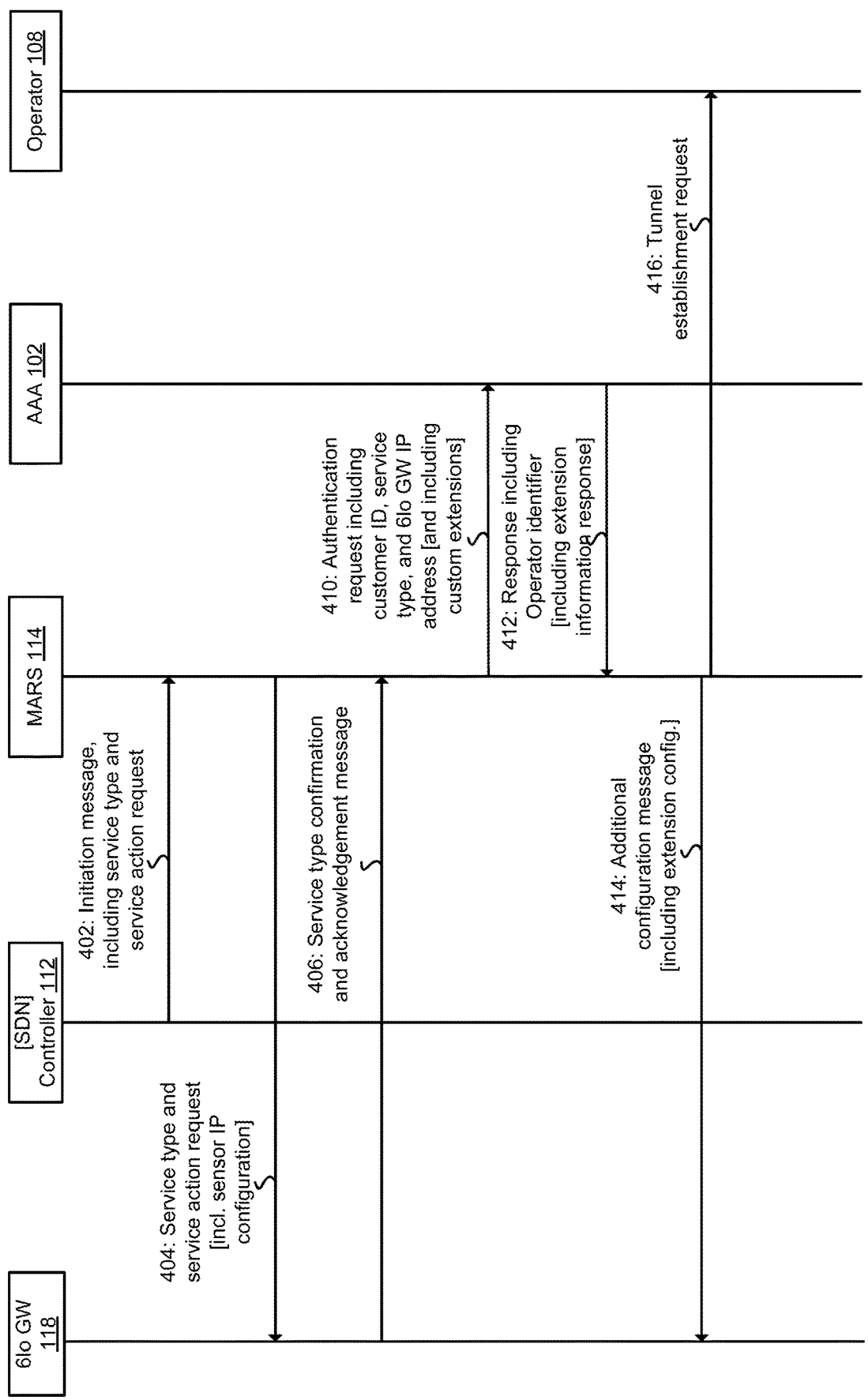
FIG. 4 is a network transaction diagram illustrating an exemplary transaction between the 6lo GW 118, controller 108, MARS 120, AAA 124, and operator 130 for converging IOT devices according to some embodiments.

FIG. 4 is a network transaction diagram illustrating an exemplary transaction between the 6lo GW 118, controller 108, MARS 120, AAA 124, and operator 130 for converging IOT devices according to some embodiments.

At 402, controller 112 sends an initiation message to MARS 114. This message includes the service type, service action, sub type, and customer ID as described above in relation to FIG. 1. In addition to the service actions previously described, the service action may also include instructions to the MARS service 114 on how to aggregate the data received from the IOT devices (e.g., aggregate based on the IOT device type type), and for service-aware control (e.g. intelligent instructions based on a dynamic awareness of the current system). At 404, the MARS service 114 sends a request including information regarding the service type and service action to the 6lo GW 118 in response to the request from the controller 112. In some embodiments, this request of transaction 404 also includes IPv6 prefix information to configure the IP address of the IOT devices as described above.

At 406, the 6lo GW 118 responds to the request of transaction 404 with a message confirming the service type with an acknowledgement. In some embodiments, two customer requests from different customers may have the same service type (e.g., two requests from two different customers with different customer IDs for the same sensors). In such an embodiment, the MARS service 114 may further pass the customer ID to the 6lo GW 118 and the 6lo GW will return the customer ID to the MARS service at transaction 406 in order to identify the correct customer.

At 410, the MARS service 114 sends an authentication request to the AAA server 102 including the unique identifier of customer ID, service type, and 6lo GW IP address. In some embodiments, this request includes a request for additional information regarding the connection, such as the compression configuration for the data, using custom extensions in the authentication protocol used by the AAA server 102.

At 412, the MARS service 114 receives a response from the AAA server 102 indicating that the AAA server 102 was able to locate a record corresponding to the unique identifier of customer ID, service type, and 6lo GW IP address. The response of transaction 412 also includes, in one embodiment, an operator identifier retrieved from the located record identifying the operator 108. In one embodiment, as part of transaction 412, the AAA server 102 also responds to any of the additional information requested via the custom extensions.

At 414, the MARS service 114 configures the 6lo GW with any additional information received from the AAA server as part of transaction 412. This may include the additional configuration information provided via the custom extensions received as part of transaction 412. For example, the additional information may include compression configuration information, security configuration information, and QoS configuration information as described above in reference to FIG. 1. The MARS service 114 may send the 6lo GW 118 this additional configuration information as part of transaction 414.

At 416, the MARS service 114 establishes a GTP tunnel with the operator 108, in order to begin transferring data that it will receive from the 6lo GW 118. A tunnel may be created for each service type, or for each 6lo GW, using mechanisms described above.

Figure 5:
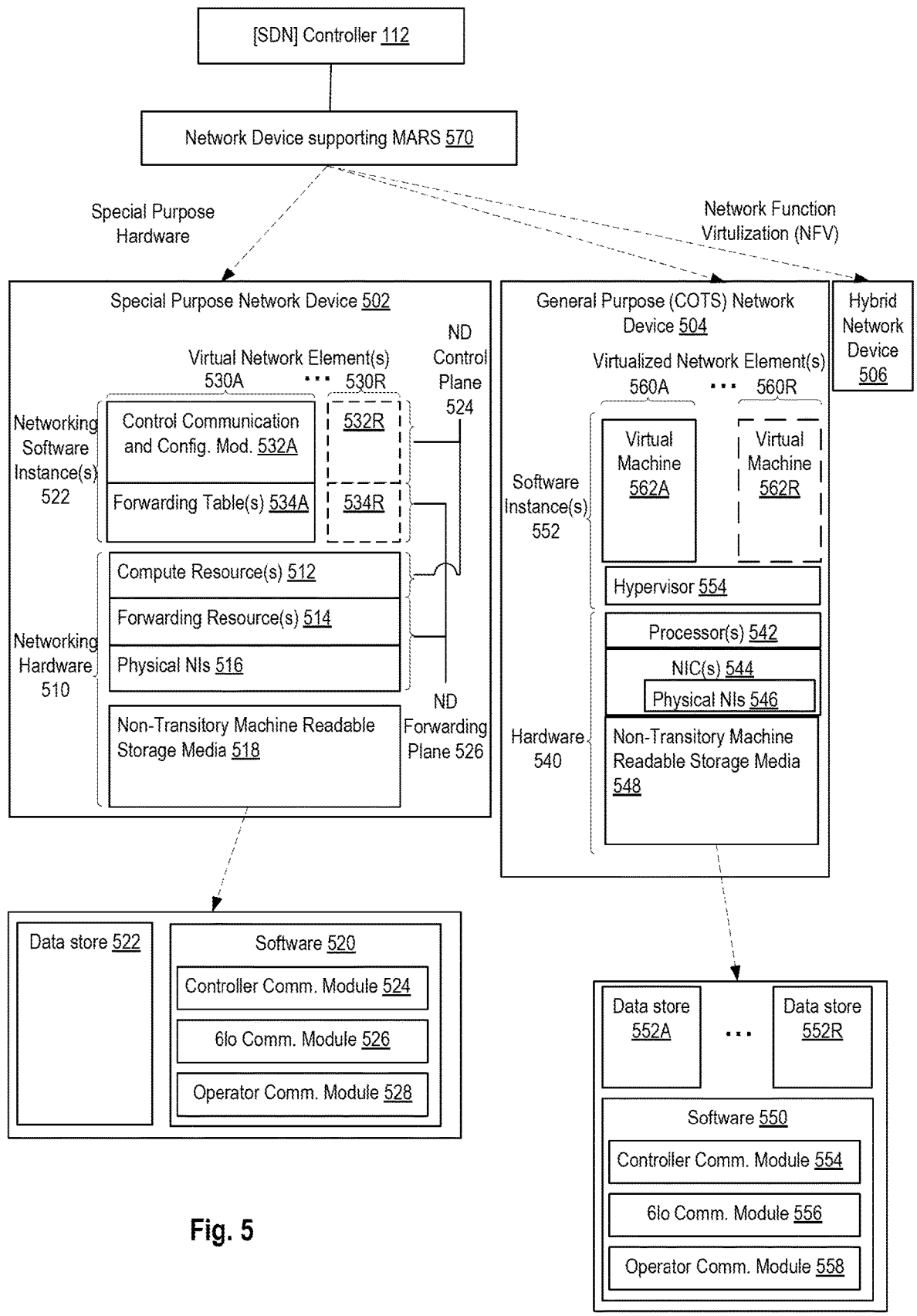
FIG. 5 illustrates connectivity between network devices (NDs) within an exemplary network, as well as three exemplary implementations of the NDs, according to some embodiments.

FIG. 5 illustrates a network device 570 (ND) coupled with controller 112 and having the functionality of a MARS service in an exemplary network, as well as three exemplary implementations of the ND, according to some embodiments. ND 570 is a physical device, and is connected to other NDs via wireless or wired connections (often referred to as a link).

Two of the exemplary ND implementations in FIG. 5 are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

The networking software 520 that executes on ND 502 includes instructions that when executed by the networking hardware 510 cause the ND 502 to have functionality similar to the functionality described for the MARS service 114. The software 520 may include a controller communications module 524 that includes instructions to allow the ND 502 to communicate with the controller 112 with functionality similar to that described above for the MARS service 114 and the controller 112. The software 520 may include a 6lo communications module 522 that includes instructions to allow the ND 502 to communicate with a 6lo GW such as 6lo GW 118 with functionality similar to that described above for the MARS service 114 and the 6lo GW118. The software 520 may also include an operator communications module 528 that includes instructions to allow the ND 502 to communicate with the operator 108 with functionality similar to that described above for the MARS service 114 and the operator 108.

Non-transitory machine readable storage media 518 also includes a data store 522. This data store may provide similar functionality to the functionality provided by data store 134 as described above.

Returning to FIG. 5, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate a hypervisor 554 (sometimes referred to as a virtual machine monitor (VMM)) and one or more virtual machines 562A-R that are run by the hypervisor 554, which are collectively referred to as software instance(s) 552. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 562A-R, and that part of the hardware 540 that executes that virtual machine (be it hardware dedicated to that virtual machine and/or time slices of hardware temporally shared by that virtual machine with others of the virtual machine(s) 562A-R), forms a separate virtual network element(s) 560A-R.

The networking software 550 that executes on ND 504 includes instructions that when executed by the processor 542 cause the virtualized network elements 560A-R to have functionality similar to the functionality described for the MARS service 114. The software 550 may include a controller communications module 554 that includes instructions to allow the virtualized network elements 560A-R to communicate with the controller 112 with functionality similar to that described above for the MARS service 114 and the controller 112. The software 520 may include a 6lo communications module 522 that includes instructions to allow the virtualized network elements 560A-R to communicate with a 6lo GW such as 6lo GW 118 with functionality similar to that described above for the MARS service 114 and the 6lo GW118. The software 520 may also include an operator communications module 528 that includes instructions to allow the virtualized network elements 560A-R to communicate with the operator 108 with functionality similar to that described above for the MARS service 114 and the operator 108.

Non-transitory machine readable storage media 548 also includes a data stores 552A-R. These data stores correspond to each of the virtualized network elements 560A-R and may provide similar functionality to the functionality provided by data store 134 as described above.

The virtual network element(s) 560A-R perform similar functionality to the virtual network element(s) 530A-R. For instance, the hypervisor 554 may present a virtual operating platform that appears like networking hardware 510 to virtual machine 562A, and the virtual machine 562A may be used to implement functionality similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments may implement one or more of the virtual machine(s) 562A-R differently. For example, while some embodiments are illustrated with each virtual machine 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 554 includes a virtual switch that provides similar forwarding services as a physical Ethernet switch. Specifically, this virtual switch forwards traffic between virtual machines and the NIC(s) 544, as well as optionally between the virtual machines 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5 is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

The NDs of FIG. 5, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., user-name/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5 may also host one or more such servers (e.g., in the case of the general purpose network device 504, one or more of the virtual machines 562A-R may operate as servers; the same would be true for the hybrid network device 506; in the case of the special-purpose network device 502, one or more such servers could also be run on a hypervisor executed by the compute resource(s) 512); in which case the servers are said to be co-located with the VNEs of that ND.

Figure 6:
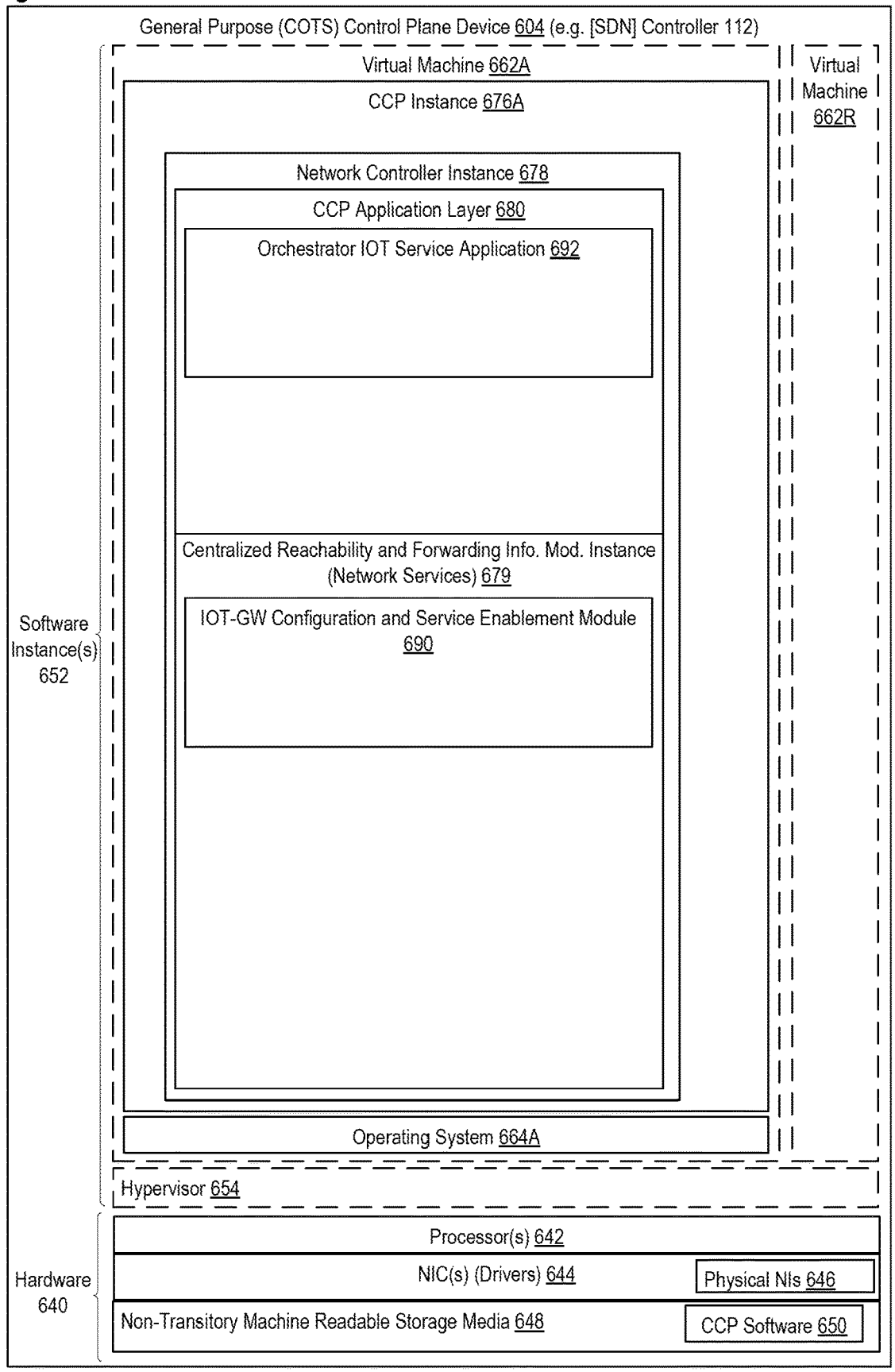
FIG. 6 illustrates a general purpose control plane device 604 including hardware 640 comprising a set of one or more processor(s) 642 (which are often Commercial off-the-shelf (COTS) processors) and network interface controller(s) 644 (NICs; also known as network interface cards) (which include physical NIs 646), as well as non-transitory machine readable storage media 648 having stored therein centralized control plane (CCP) software 650), according to some embodiments.

FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650. Such a control plane device 604 may implement the functionality of controller 112.

In embodiments that use compute virtualization, the processor(s) 642 typically execute software to instantiate a hypervisor 654 (sometimes referred to as a virtual machine monitor (VMM)) and one or more virtual machines 662A-R that are run by the hypervisor 654; which are collectively referred to as software instance(s) 652. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 650 (illustrated as CCP instance 676A) on top of an operating system 664A are typically executed within the virtual machine 662A. In embodiments where compute virtualization is not used, the CCP instance 676A on top of operating system 664A is executed on the "bare metal" general purpose control plane device 604.

The operating system 664A provides basic processing, input/output (I/O), and networking capabilities. In some embodiments, the CCP instance 676A includes a network controller instance 678. The network controller instance 678 includes a centralized reachability and forwarding information module instance 679 (which is a middleware layer providing the context of the network controller 578 to the operating system 664A and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

In some embodiments, the functionality provided by the orchestrator 104 as described above is software residing on non-transitory machine readable storage media 648 and executing in the application layer of control plane device 604 as orchestrator IOT service application 692.

In some embodiments, the functionality provided by the controller 112 as described above in regards to communications with the MARS service beyond that of a typical control plane device 104 is software residing on non-transitory machine readable storage media 648 and executing in the middleware layer 679 of control plane device 604 as IOT-GW Configuration and Service Enablement Module 690.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows defined by the destination IP address for example; however, in other implementations the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Figure 7:
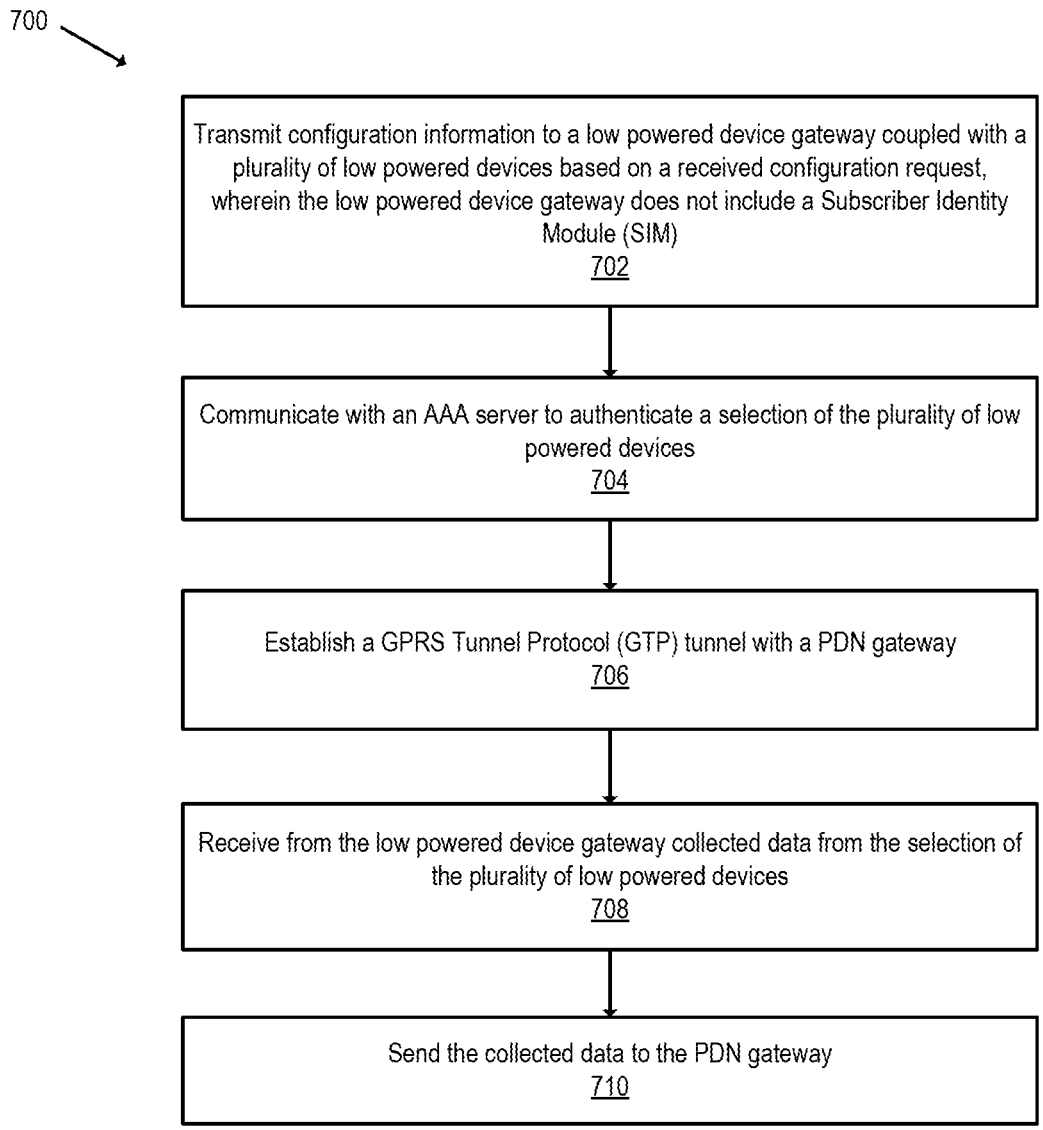
FIG. 7 is a flow diagram illustrating a method for converging IOT devices in a mobile network according to some embodiments.

FIG. 7 is a flow diagram illustrating a method for converging IOT devices in a mobile network according to some embodiments. For example, method 700 can be performed by the MARS service 114. Method 700 may be implemented in software, firmware, hardware, or any combination thereof. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

Referring now to FIG. 7, at 702, the MARS service transmits configuration information to a low powered device gateway coupled with a plurality of low powered devices based on a received configuration request, wherein the low powered device gateway does not include a Subscriber Identity Module (SIM). In some embodiments, the low powered device gateway is 6lo GW 118 and the low powered devices are IOT devices 120-128. In some embodiments, the configuration information includes a service type and a service action based on the received configuration request, wherein the service type identifies the selection of the plurality of low powered devices, and wherein the service action causes the low powered device gateway to perform at least one of report data, start data collection, stop data collection, and establish secure communications between the low powered device gateway and the network element.

In some embodiments, the configuration information further includes IP address configuration information, and wherein upon receiving the IP address configuration information, the low powered device gateway is caused to configure the selection of the plurality of low powered devices with IP addresses based on the IP address configuration information. In some embodiments, the configuration request is received from a software defined networking (SDN) controller (e.g., controller 112, and wherein the SDN controller includes an orchestrator module (e.g., orchestrator 104) that receives input from a customer for the configuration request.

At 704, the MARS service communicates with an AAA server to authenticate a selection of the plurality of low powered devices. In some embodiments, this AAA server is AAA server 102. In some embodiments, the communication with the AAA server to authenticate the selection of the plurality of low powered devices includes the MARS service authenticating the selection of the plurality of low powered devices based on a service type, a customer identifier, and the address of the low powered device gateway, wherein the service type identifies the selection of the plurality of low powered devices, and wherein the customer identifier identifies a customer account from which the configuration request was received. In some embodiments, the communication with the AAA server to authenticate the selection of the plurality of low powered devices includes the MARS service receiving from the AAA server a reply with an identifier of the PDN gateway.

At 706, the MARS service establishes a GPRS Tunnel Protocol (GTP) tunnel with a PDN gateway. In some embodiments, the PDN gateway is operator 108. In some embodiments, the MARS service, for each of a set of one or more service types received in the configuration request, establishes a corresponding GTP tunnel to the PDN gateway for that service type.

At 708, the MARS service receives from the low powered device gateway collected data from a selection of the plurality of low powered devices. At 710, the MARS service sends the collected data to the PDN gateway. In some embodiments, the MARS service aggregates the collected data to be sent to the PDN gateway, wherein the collected data is aggregated based upon a type of the collected data.

In some embodiments, the MARS service establishes a secured channel between the MARS service and the low powered device gateway based on the received configuration request.

As described earlier, the gateways 118 can be communicatively coupled with the MARS 114 (and other entities) using a variety of telecommunications technologies. For example, FIG. 2 illustrates a secured private network Ethernet link 204 coupling the MARS 114 with the one or more gateways 118, and this link is described as alternatively utilizing any number of different wired and/or wireless communication technologies. Additionally, FIG. 3 illustrates the MARS 114 being communicatively coupled with one or more gateways 118 using a logical SWu' interface (e.g., an IPSec tunnel) and also coupled with a PDN GW 308 via an S2b' interface (e.g., one or more GTP tunnels 126).

Figure 8:
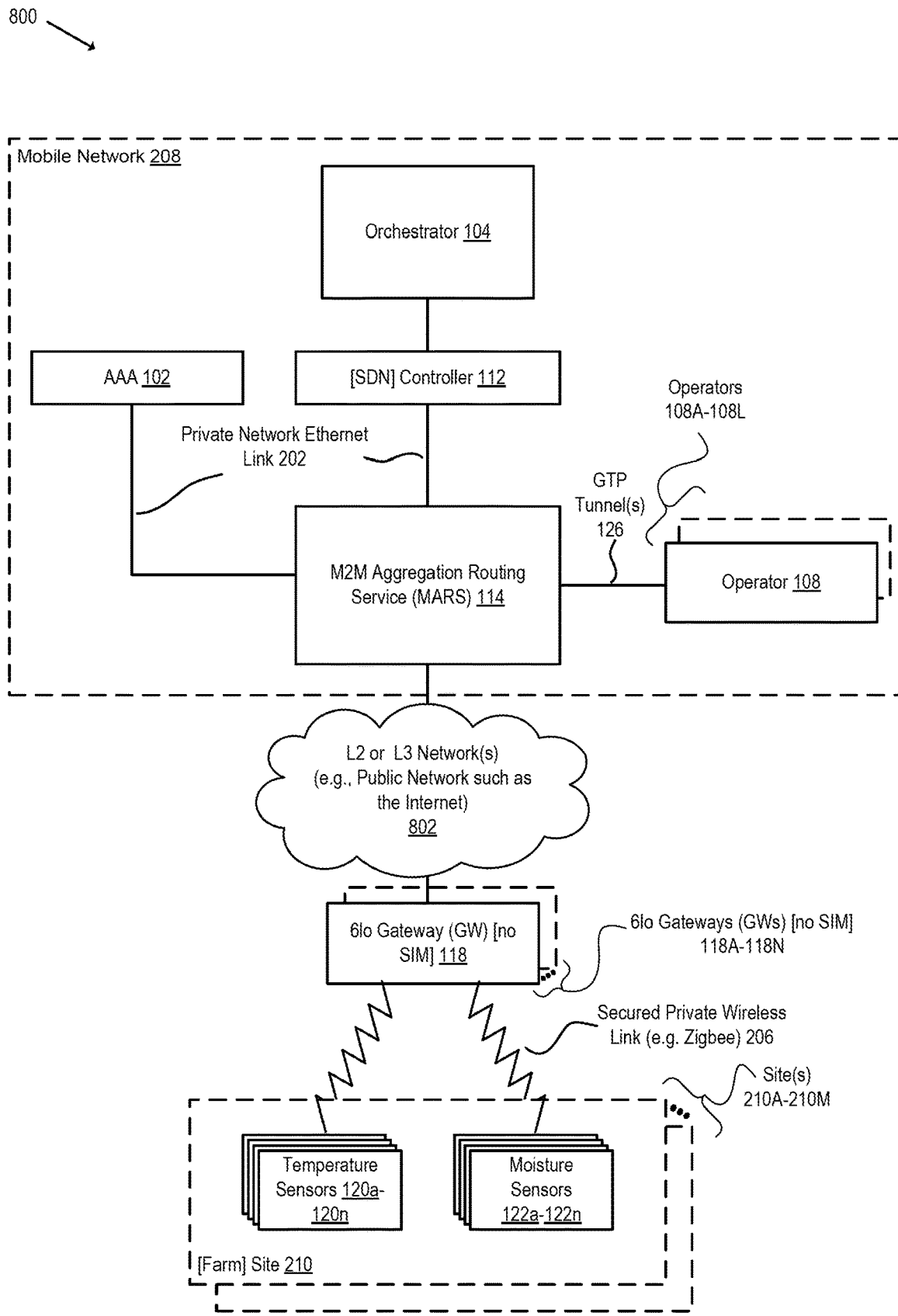
FIG. 8 is a block diagram illustrating an exemplary architecture 800 of a system utilizing one or more L2/L3 networks to couple a MARS with one or more gateways according to some embodiments.

To further describe one of many such alternative configurations, FIG. 8 is a block diagram illustrating an exemplary architecture 800 of a system utilizing one or more L2/L3 networks 802 to communicatively couple a MARS with one or more gateways 118 according to some embodiments. FIG. 8 is similar to FIG. 2, although some differences exist. As illustrated, the one or more gateways 118A-118N (which do not have SIMs, or do not have SIMs that are utilized for the purposes described herein) can be communicatively coupled with MARS 114 using one or more L2 or L3 networks 802 (Level 2 or Level 3 in the seven-layer Open Systems Interconnection-or OSI-model of computer networking, which represent the data link layer and network layer, respectively). The one or more L2 or L3 networks 802 can include a public network such as the Internet and/or another network using, for example, ATM, Wi-Fi, PPP, IPv4, IPv6, etc.

In some embodiments the one or more gateways 118A-118N can be configured with (or provided) a network address or network identifier of the MARS 114 that the one or more gateways 118A-118N can use to "connect" to (or simply, transmit data to and/or receive data from) the MARS 114. For example, the one or more gateways 118A-118N in some embodiments are configured with (or provided) one or more publicly-routable IP addresses of the MARS 114 that can be used as a destination address for sending data via the one or more L2 or L3 networks 802. In some embodiments, the one or more gateways 118A-118N can be provided or configured with a network identifier comprising a domain, hostname, Uniform Resource Identifier (URI) or Uniform Resource Locator (URL), etc., which the one or more gateways 118A-118N can use to perform DNS lookups to acquire a routable network address for the MARS 114, which can be used to perform an initial registration, transmit data, etc.

Accordingly, in some embodiments one or more gateways 118, each communicatively coupled with one or more sensors 120/122—which can be located at one or more multiple sites 210A-210M—can be communicatively coupled with MARS 114 (e.g., using the Internet or other network(s)) to provide aggregation service for one or multiple users, via one or multiple operators 108A-108L (e.g., mobile network operators).

Figure 9:
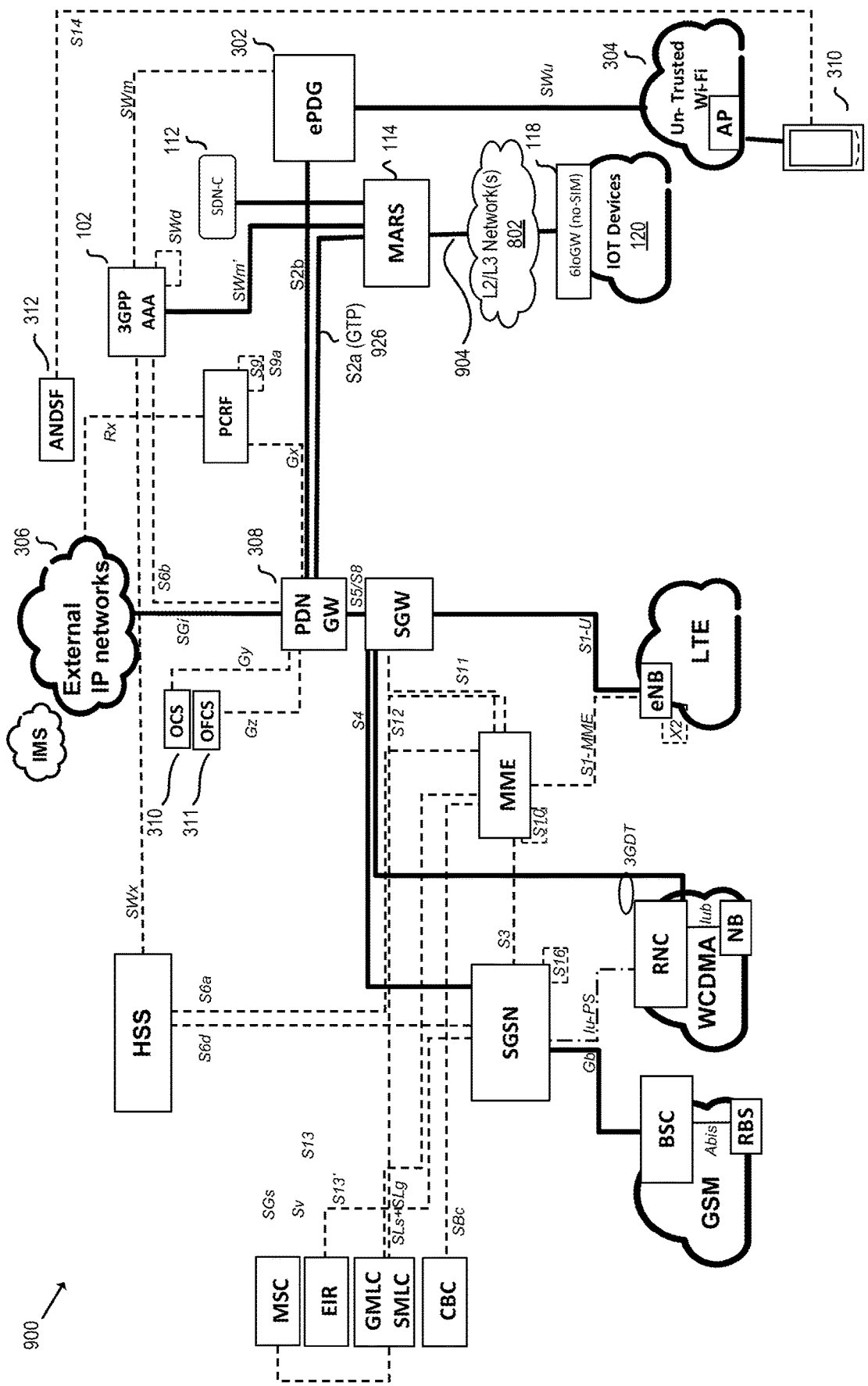
FIG. 9 illustrates an exemplary 3GPP architecture 900 with a MARS service 114 coupled with one or more gateways over one or more L2/L3 networks according to some embodiments.

Additionally, FIG. 9 illustrates an exemplary 3GPP architecture 900 with a MARS service 114 coupled with one or more gateways over one or more L2/L3 networks according to some embodiments. FIG. 9 is similar to FIG. 3, however it presents several differences.

For example, the 6lo GW 118—which is communicatively coupled with one or more IOT devices 120—is further communicatively coupled with MARS 114 using a connection/link 904 travelling through one or more L2/L3 networks 802, such as the Internet. In some embodiments, MARS 114 can be communicatively coupled with a PDN GW 308 (e.g., of an operator) via a logical S2a interface, which can comprise a GTP tunnel (e.g., a GTPv2 tunnel) that supports interworking with 3GPP and non-3GPP access systems.

Figure 10:
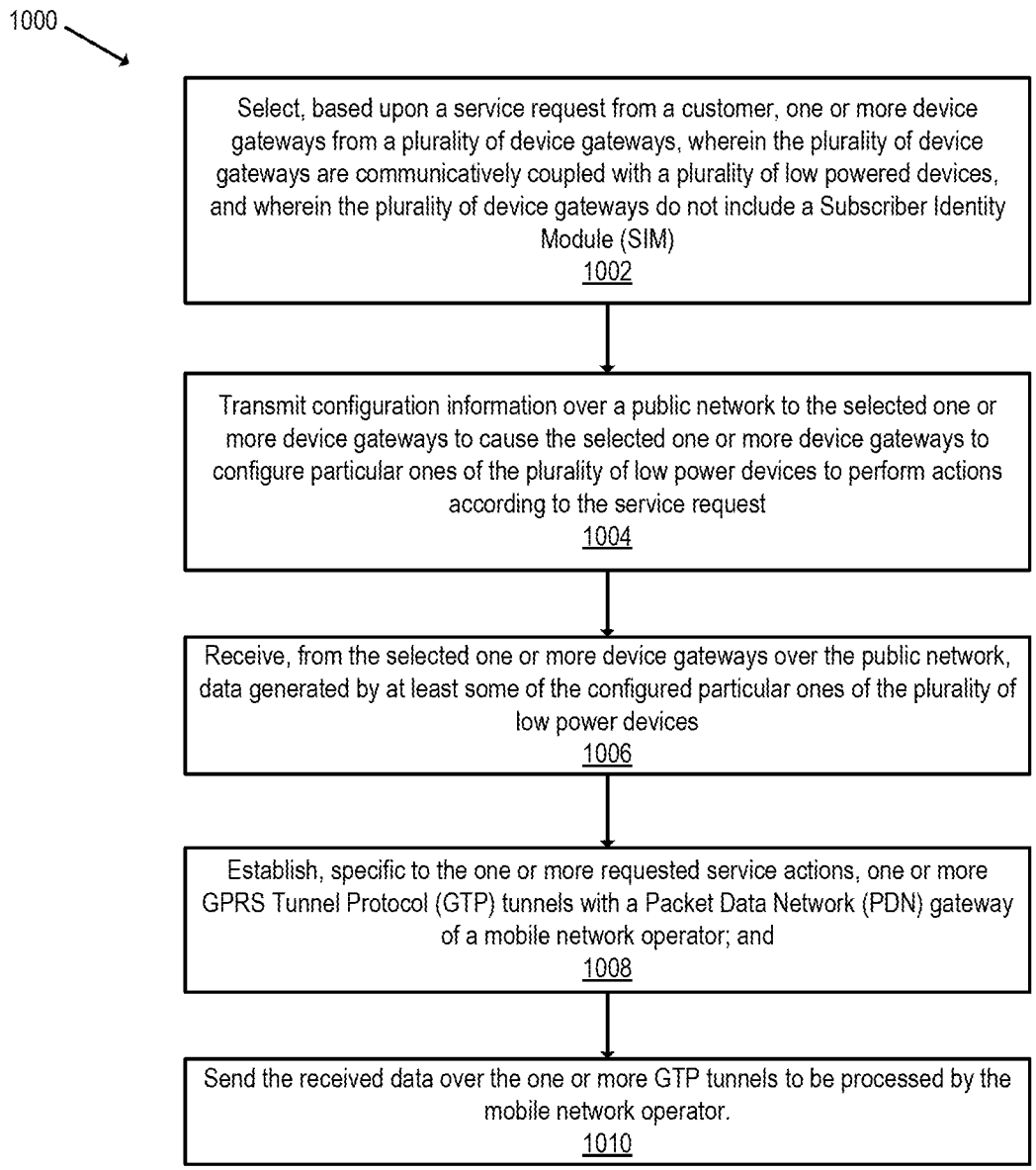
FIG. 10 is a flow diagram illustrating a method for converging IOT devices with a mobile network according to some embodiments.

FIG. 10 is a diagram illustrating a flow 1000 for converging IOT devices with a mobile network according to some embodiments. For example, the flow 1000 can be performed by the MARS service 114, such as the MARS service 114 illustrated in FIG. 9.

At block 1002, the flow includes selecting, based upon a service request from a customer, one or more device gateways from a plurality of device gateways. The plurality of device gateways are communicatively coupled with a plurality of low powered devices, and the plurality of device gateways do not include or utilize a SIM.

At block 1004, the flow includes transmitting configuration information over a public network to the selected one or more device gateways, to cause the selected one or more device gateways to configure particular ones of the plurality of low power devices to perform actions according to the service request.

In some embodiments, the one or more device gateways are 6lo GW 118, and the low powered devices are IOT devices 120-128. In some embodiments, the configuration information identifies a service type and a service action, where the service type identifies the selection of the plurality of low powered devices, and the service action causes the device gateway to perform at least one of report data, start data collection, stop data collection, and establish secure communications between the device gateway and, for example, the MARS service 114.

In some embodiments, the configuration information further includes IP address configuration information, and upon receiving this IP address configuration information, the one or more device gateways are caused to configure the selection of the plurality of low powered devices with IP addresses based on the IP address configuration information.

In some embodiments, the flow can include communicating with an AAA server to authenticate a selection of the plurality of low powered devices. In some embodiments, this AAA server is AAA server 102. In some embodiments, the communication with the AAA server to authenticate the selection of the plurality of low powered devices includes authenticating the selection of the plurality of low powered devices based on a service type, a customer identifier, and the address of the device gateway, wherein the service type identifies the selection of the plurality of low powered devices, and wherein the customer identifier identifies a customer account from which the configuration request was received. In some embodiments, the communication with the AAA server to authenticate the selection of the plurality of low powered devices includes receiving, from the AAA server, a reply with an identifier of a PDN gateway.

At block 1006, the flow includes receiving, from the selected one or more device gateways over the public network, data generated by at least some of the configured particular ones of the plurality of low power devices, and at block 1008, the flow includes establishing, specific to the one or more requested service actions, one or more GPRS Tunnel Protocol (GTP) tunnels with a Packet Data Network (PDN) gateway of a mobile network operator. In some embodiments, the PDN gateway is operator 108. In some embodiments, for each of a set of one or more service types received in the configuration request, the flow includes establishing a corresponding GTP tunnel to the PDN gateway for that service type.

At block 1010, the flow includes sending the received data over the one or more GTP tunnels to be processed by the mobile network operator. In some embodiments, the collected data is aggregated to be sent to the PDN gateway, wherein the collected data is aggregated based upon a type of the collected data.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a routing services node implemented by a network device, comprising:

sending, by the routing services node, a request to an authentication, authorization and accounting (AAA) server to authenticate a gateway device that is communicatively coupled with a plurality of devices via use of one or more wireless communication protocols, wherein the gateway device does not include a physical Subscriber Identity Module (SIM) issued by any mobile network operator;

receiving a response to the request that was originated by the AAA server, the response including an operator identifier and indicating that the gateway device is authorized to communicate with the mobile network operator corresponding to the operator identifier;

establishing, based on the operator identifier, one or more tunnels between the routing services node and a Packet Data Network (PDN) gateway of the mobile network operator;

receiving, at the routing services node, a plurality of packets originated by the gateway device that were transmitted via the Internet, the plurality of packets carrying data, the data being generated by the plurality of devices or by the device gateway based on other data generated by the plurality of devices; and transmitting, by the routing services node, the plurality of packets to the mobile network operator via the one or more tunnels.

2. The method of claim 1, wherein:

the one or more tunnels comprise a plurality of GPRS Tunneling Protocol (GTP) tunnels;

a first portion of the received plurality of packets is sent over a first of the plurality of GTP tunnels to be processed by the mobile network operator; and a second portion of the received plurality of packets is sent over a second of the plurality of GTP tunnels to be processed by the mobile network operator.

3. The method of claim 1, wherein the request sent to the AAA server includes at least one of:

a customer identifier of a customer associated with the gateway device; or an Internet Protocol (IP) address utilized by the gateway device.

4. The method of claim 3, wherein the operator identifier comprises an Access Point Name (APN).

5. The method of claim 1, further comprising:
receiving, from a controller, a message including a customer identifier and one or more identifiers of the plurality of devices; and
identifying, by the routing services node via a data store based on the message, the device gateway from a plurality of device gateways.

6. The method of claim 5, further comprising:
responsive to the identifying of the device gateway, transmitting one or more messages to the device gateway indicating a command to configure the plurality of devices or the device gateway.

7. The method of claim 6, wherein the command indicates a request to configure the plurality of devices with a plurality of Internet Protocol (IP) addresses.

8. The method of claim 6, wherein the command indicates a request to configure the plurality of devices to encrypt data to be sent by the plurality of devices to the device gateway.

9. The method of claim 1, wherein the plurality of devices comprises a plurality of sensor devices, and wherein the data or other data generated by the plurality of devices comprises sensor data values generated by the plurality of sensor devices.

10. The method of claim 1, wherein the plurality of devices comprise Internet of Things (IoT) devices, wherein at least one of the plurality of devices comprises a temperature sensor, a moisture sensor, a light intensity sensor, a utility meter, a gas level sensor, a switch device, a light emitter, a sound sensor, a vehicle, a charging point, a field soil sensor, an industrial device monitor, a building monitor, a bridge monitor, an environmental monitor, or a body sensor.

11. A non-transitory computer-readable storage medium having instructions which, when executed by a processor of a network device, cause the network device to implement a routing services node to perform operations comprising:
sending a request to an authentication, authorization and accounting (AAA) server to authenticate a gateway device that is communicatively coupled with a plurality of devices via use of one or more wireless communication protocols, wherein the gateway device does not include a physical Subscriber Identity Module (SIM) issued by any mobile network operator;
receiving a response to the request that was originated by the AAA server, the response including an operator identifier and indicating that the gateway device is authorized to communicate with a mobile network operator corresponding to the operator identifier;
establishing, based on the operator identifier, one or more tunnels between the routing services node and a Packet Data Network (PDN) gateway of the mobile network operator;
receiving a plurality of packets originated by the gateway device that were transmitted via the Internet, the plurality of packets carrying data, the data being generated by the plurality of devices or by the device gateway based on other data generated by the plurality of devices; and
transmitting the plurality of packets to the mobile network operator via the one or more tunnels.

12. The non-transitory computer-readable storage medium of claim 11, wherein:
the one or more tunnels include a plurality of GPRS Tunneling Protocol (GTP) tunnels;
a first portion of the received data is sent over a first of the plurality of GTP tunnels to be processed by the mobile network operator; and
a second portion of the received data is sent over a second of the plurality of GTP tunnels to be processed by the mobile network operator.

13. The non-transitory computer-readable storage medium of claim 11, wherein the request sent to the AAA server includes at least one of:
a customer identifier of a customer associated with the gateway device; or
an Internet Protocol (IP) address utilized by the gateway device.

14. The non-transitory computer-readable storage medium of claim 13, wherein the operator identifier comprises an Access Point Name (APN).

15. The non-transitory computer-readable storage medium of claim 11, wherein the operations further comprise:
receiving, from a controller, a message including a customer identifier and one or more identifiers of the plurality of devices; and
identifying, via a data store based on the message, the device gateway from a plurality of device gateways.

16. The non-transitory computer-readable storage medium of claim 15, wherein the operations further comprise:
responsive to the identifying of the device gateway, transmitting one or more messages to the device gateway indicating a command to configure the plurality of devices or the device gateway.

17. The non-transitory computer-readable storage medium of claim 16, wherein the command indicates a request to either:
configure the plurality of devices with a plurality of Internet Protocol (IP) addresses; or
configure the plurality of devices to encrypt data to be sent by the plurality of devices to the device gateway.

18. The non-transitory computer-readable storage medium of claim 11, wherein the plurality of devices comprises a plurality of sensor devices, and wherein the data or other data generated by the plurality of devices comprises sensor data values generated by the plurality of sensor devices.

19. The non-transitory computer-readable storage medium of claim 11, wherein the plurality of devices comprise Internet of Things (IoT) devices, wherein at least one of the plurality of devices comprises a temperature sensor, a moisture sensor, a light intensity sensor, a utility meter, a gas level sensor, a switch device, a light emitter, a sound sensor, a vehicle, a charging point, a field soil sensor, an industrial device monitor, a building monitor, a bridge monitor, an environmental monitor, or a body sensor.

20. A device, comprising:
one or more processors; and
a non-transitory computer-readable storage medium having instructions which, when executed by the one or more processors, cause the device to implement a routing services node to:
send a request to an authentication, authorization and accounting (AAA) server to authenticate a gateway device that is communicatively coupled with a plurality of devices via use of one or more wireless communication protocols, wherein the gateway device does not include a physical Subscriber Identity Module (SIM) issued by any mobile network operator;

receive a response to the request that was originated by the AAA server, the response including an operator identifier and indicating that the gateway device is authorized to communicate with a mobile network operator corresponding to the operator identifier;

establish, based on the operator identifier, one or more tunnels between the routing services node and a Packet Data Network (PDN) gateway of the mobile network operator;

receive a plurality of packets originated by the gateway device that were transmitted via the Internet, the plurality of packets carrying data, the data being generated by the plurality of devices or by the device gateway based on other data generated by the plurality of devices; and transmit the plurality of packets to the mobile network operator via the one or more tunnels.

\* \* \* \* \*